United States Patent [19]

Newsome

[11] Patent Number: 4,967,899

[45] Date of Patent: Nov. 6, 1990

[54] APPARATUS FOR RE-ORIENTING ARTICLES

[76] Inventor: John R. Newsome, c/o Sim Products, R.R. #1, Box 58A, Shumway, Ill. 62461

[21] Appl. No.: 402,507

[22] Filed: Sep. 5, 1989

[51] Int. Cl.[5] ............................................. B65G 47/24
[52] U.S. Cl. .................................... 198/411; 198/415; 198/416; 271/225; 271/185
[58] Field of Search ............... 198/411, 412, 415, 416; 271/225, 184, 185

[56] References Cited

U.S. PATENT DOCUMENTS 3,269,513  8/1966  Del Rosso ........................... 198/416
3,834,516  9/1974  Reeser ................................. 198/416
4,085,839  8/1978  Crawford ........................ 198/416 X Primary Examiner—H. Grant Skaggs
Assistant Examiner—Keith L. Dixon
Attorney, Agent, or Firm—Leydig, Voit & Mayer, Ltd.

[57] ABSTRACT

Magazines are re-oriented by turning each magazine through ninety degrees in a horizontal plane while the magazine is advanced continuously along a generally straight path. The re-orientation is effected by kicking each magazine laterally while switching control of the magazine from a first continuously moving conveyor to a second continuously moving conveyor which runs alongside the first conveyor.

9 Claims, 4 Drawing Sheets

APPARATUS FOR RE-ORIENTING ARTICLES

BACKGROUND OF THE INVENTION

This invention relates generally to apparatus for re-orienting articles and, more particularly, to apparatus for turning newly bound magazines in a horizontal plane from one orientation to another.

Magazines discharged from a binding machine typically are oriented with the backbone of each magazine disposed in leading relation. Following the binding operation, it may be necessary to turn the magazines to a different orientation in order to facilitate labeling, insertion of inserts, wrapping or the like. Prior apparatus for re-orienting magazines generally relies on a mechanical bump-turn system in which the magazines stop and start while making a right angle change in direction of travel in order to effect the re-orientation. Such apparatus is bulky and, because of the need to stop and start the magazines, does not lend itself to the extremely high speed operation required by modern printing establishments.

SUMMARY OF THE INVENTION

The general aim of the present invention is to provide new and improved article re-orienting apparatus which is particularly suitable for use in re-orienting magazines, books or the like and which, when compared with prior systems, occupies substantially less floor space and is capable of operating at significantly high speeds.

A more detailed object of the invention is to achieve the foregoing by providing apparatus for re-orienting the magazines while the magazines are traveling continuously and in the same direction from the entry end of the apparatus to the exit end thereof.

In still a more detailed sense, the invention resides in re-orienting apparatus having two side-by-side straight-through conveyors and having mechanism coacting with the conveyors and causing the magazines to turn as the magazines are switched from the control of one conveyor to the control of the other conveyor.

These and other objects and advantages of the invention will become more apparent from the following detailed description when taken in conjunction with the accompanying drawings.

DETAILED DESCRIPTION OF THE PREFERRED EMBODIMENT

Figure 1:
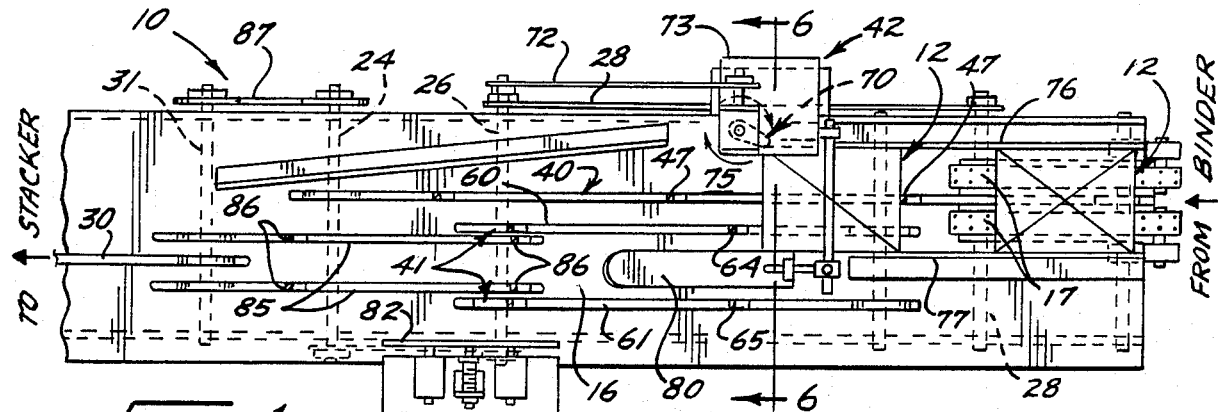
FIG. 1 is a fragmentary top plan view of new and improved re-orienting apparatus incorporating the unique features of the present invention and showing a magazine just prior to the magazine being turned.
Figure 2:
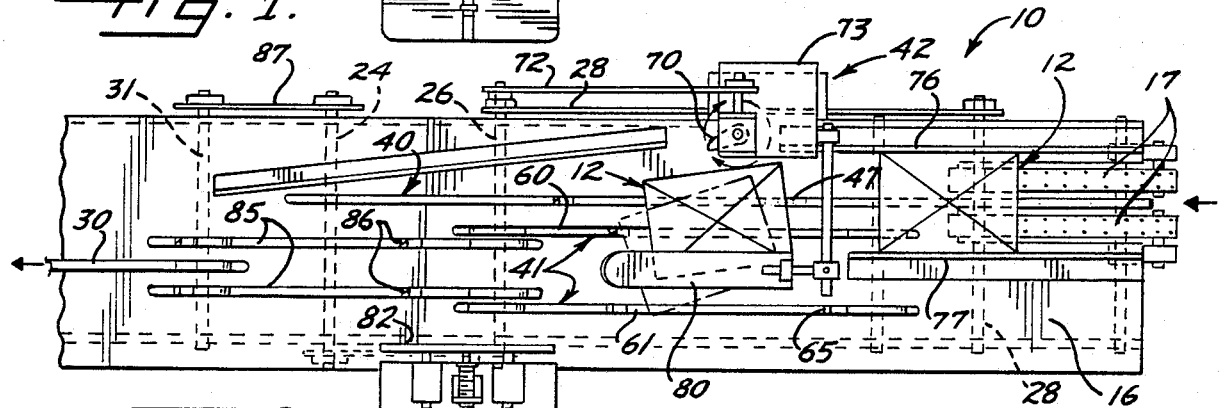
FIG. 2 is a view similar to FIG. 1 but shows the magazine during turning thereof.
Figure 3:
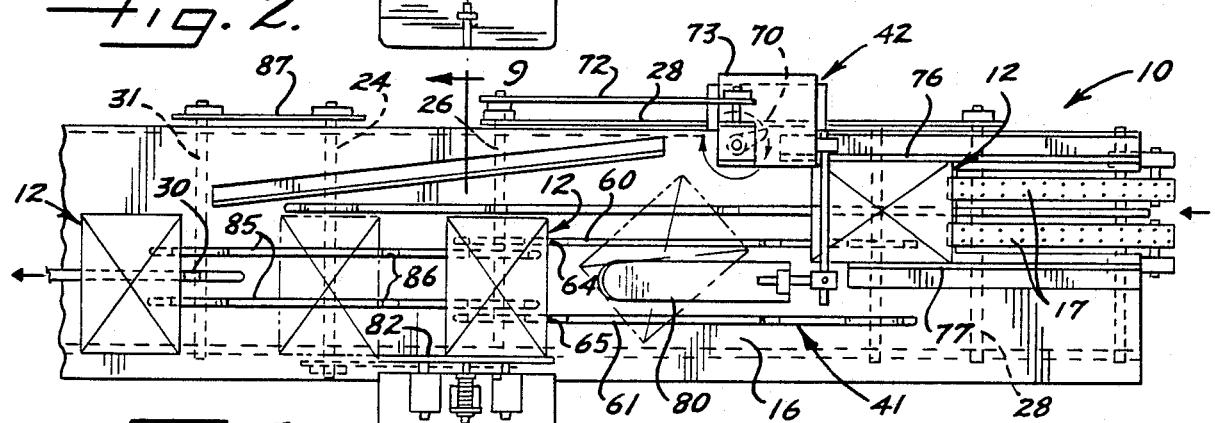
FIG. 3 also is a view similar to FIG. 1 and shows the magazine just after the magazine has been fully turned.

For purposes of illustration, the invention has been shown in the drawings as embodied in apparatus 10 for re-orienting articles in a horizontal plane and specifically for re-orienting magazines 12 which have just been discharged from a binding machine (not shown). Simply for convenience of illustration, each magazine has been shown as initially positioned with its "foot" 13 (FIG. 4) disposed in leading relation and with its "backbone" 14 located to the right when the apparatus 10 is viewed from its upstream end. The present apparatus 10 re-orients the magazine by turning the magazine through ninety degrees in a horizontal plane and in a counterclockwise direction such that the backbone of the magazine is disposed in leading relation. It will be appreciated, however, that the magazines could enter the apparatus 10 in a different orientation (e.g., with the backbone leading) and could be turned from that orientation by the apparatus. The magazines are turned from their original positions in order to facilitate labeling, wrapping, the insertion of mailers, or similar operations which typically occur after the magazines have been bound and before the magazines are stacked for cartoning.

The apparatus 10 comprises a frame which includes a pair of laterally spaced side plates 15 (FIG. 5) disposed in vertical planes and extending from the entrance end of the apparatus to the exit end thereof. A horizontal bedplate 16 (FIG. 6) is secured to the upper ends of the side plates and supports the magazines 12 as the latter are advanced and turned by the apparatus 10.

Two laterally spaced vacuum belts 17 (FIG. 5) are located at the upstream end of the apparatus 10 and serve to feed the apparatus with magazines 12 from the binder, the magazines being fed single file and in a predetermined spaced relation. The vacuum belts are driven by a motor 18 which acts through a speed reducer 19 to rotate a cycle shaft 20. The latter acts through a belt drive 21, a right-angle gearbox 22 and a belt drive 23 to rotate a shaft 24 which extends between and is journaled by the side plates 15. Another belt drive 25 is connected between the shaft 24 and a parallel, upstream shaft 26 which acts through yet another belt drive 27 to rotate a shaft 28 that supports and drives the downstream sheaves for the vacuum belts 17.

Figure 9:
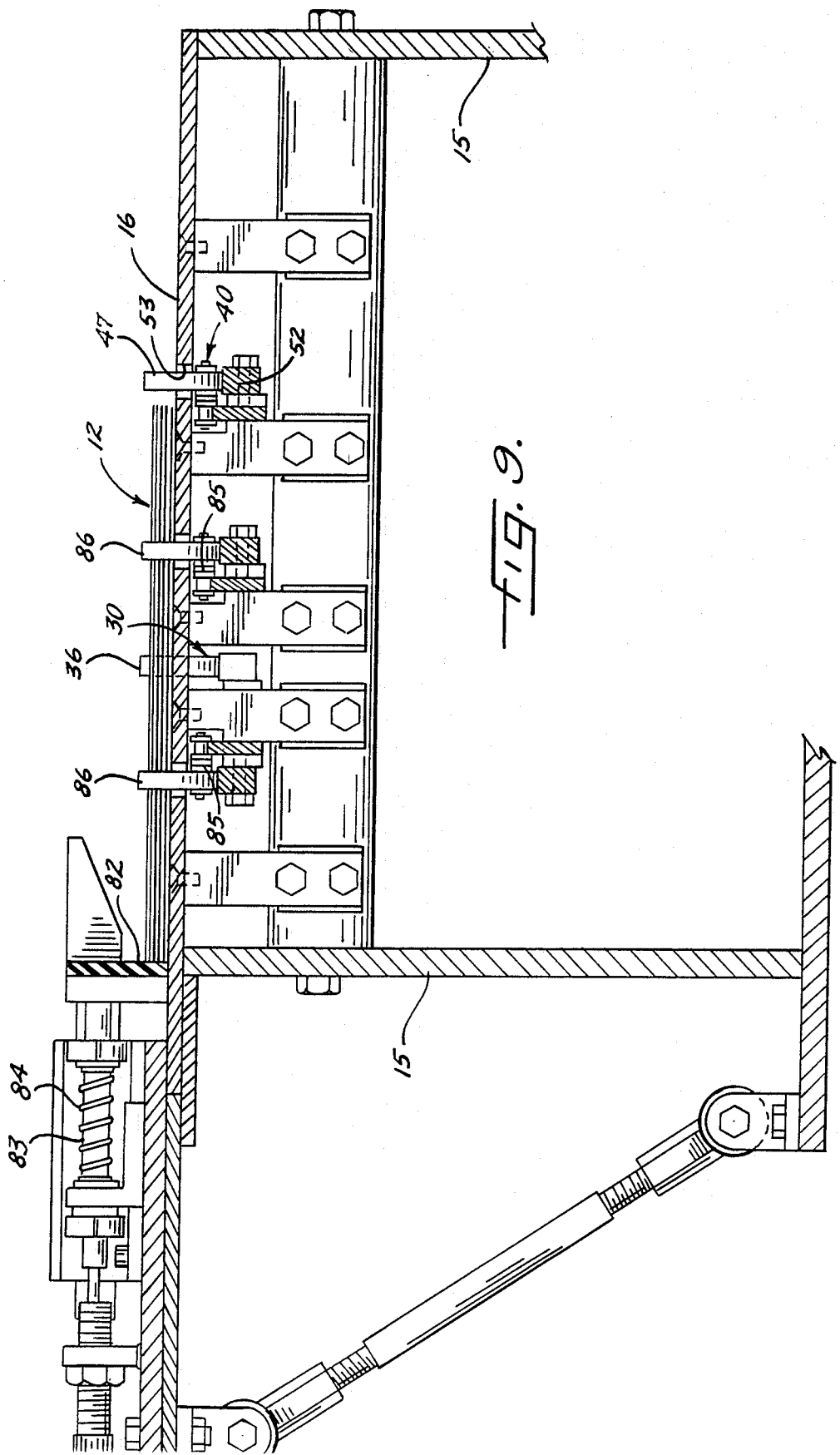
FIG. 9 is an enlarged fragmentary cross-section taken substantially along the line 9—9 of FIG. 3.

The magazines 12 are carried away from the apparatus 10 and are delivered to a stacker (not shown) by an exit conveyor 30 (FIG. 5) which includes parallel supporting shafts 31 and 32 that extend between the side plates 15. A belt drive 33 leads from the shaft 32 to a right angle gear box 34 which, in turn, is driven from the cycle shaft 20 by a belt drive 35. Thus, the exit conveyor 30 is driven in timed relation with the vacuum belts 17. The exit conveyor carries spaced pusher lugs 36 (FIG. 9) which engage the trailing ends of the magazines 12 in order to advance the magazines along the bedplate 16 to the stacker.

In accordance with the present invention, two laterally spaced conveyors 40 and 41 extend side-by-side with one another between the vacuum belts 17 and the exit conveyor 30 and coact with one another and with a turning mechanism 42 to re-orient the magazines 12 while advancing the magazines from the vacuum belts toward the exit conveyor. The two conveyors 40 and 41 advance the magazines with continuous motion and effect the re-orientation without changing the direction in which the magazines are advanced. Accordingly, the re-orientation is effected at high speed and with in-line or straight-through apparatus 10 which occupies comparatively little floor space.

More specifically, the conveyor 40 is formed by a single roller chain which is trained around a downstream drive sprocket 44 (FIG. 5) and an upstream idler sprocket 45. The drive sprocket is fixed to the shaft 24 while the idler sprocket is located between the vacuum belts 17 adjacent the upstream ends thereof. The upper run of the conveyor 40 is horizontal and is advanced from right to left (FIG. 5) when the drive sprocket 44 is rotated in a counterclockwise direction by the shaft 24.

Figure 8:
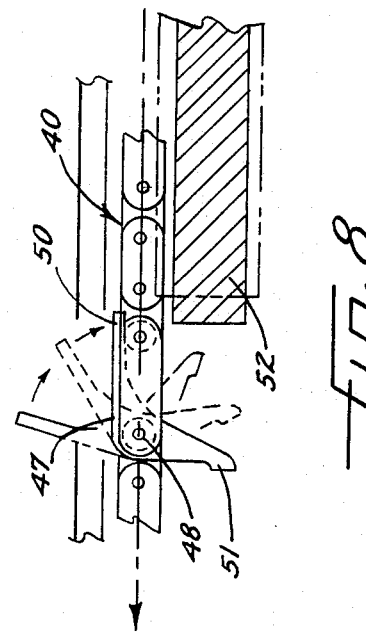
FIG. 8 is a fragmentary view similar to FIG. 7 but shows certain parts in moved positions.
Figure 7:
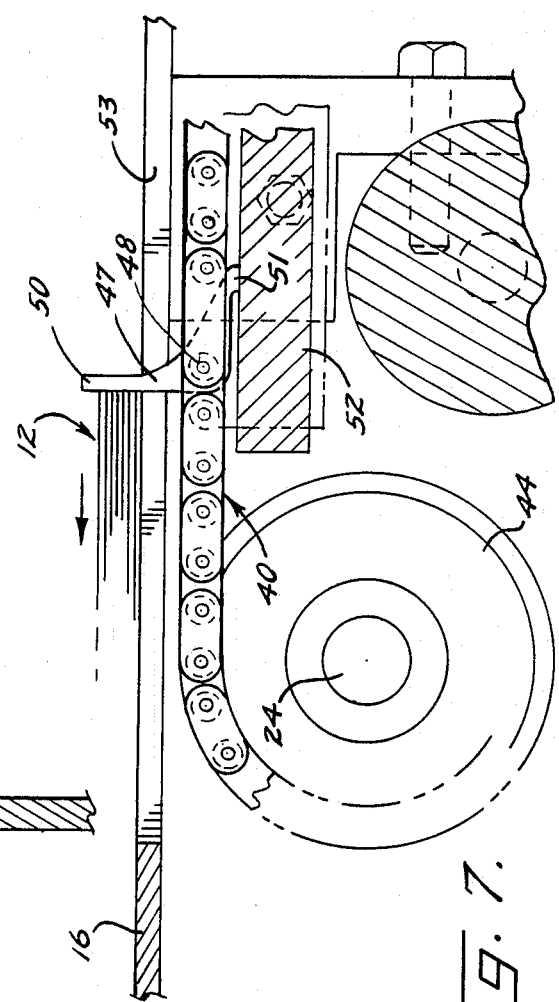
FIG. 7 is a fragmentary cross-section taken substantially along the line 7—7 of FIG. 6.

Carried on and spaced along the conveyor chain 40 are several equally spaced pushers 47 (FIG. 7) which are pivotally connected at 48 to the links of the chain. Herein, each pusher includes a pushing lug 50 and a generally right angled supporting lug 51. As the pushers 47 travel with the upper run of the conveyor 40, the supporting lug 51 rides on an underlying rail 52 and holds the pushing lug 50 in an upright position in which the pushing lug projects upwardly through a slot 53 in the bedplate 16 (see FIG. 7). When the pushing lug is so repositioned, it engages the upstream end of a magazine 12 to advance the magazine along the bedplate. Just before each pusher 47 reaches the downstream sprocket 44, the supporting lug 51 rides off of the rail 52 to allow the pusher to swing clockwise about the pivot 48 under its own weight and thereby cause the pushing lug 50 to fall to an inactive position shown in FIG. 8.

The conveyor 41 comprises two laterally spaced chains 60 and 61 (FIG. 5) disposed in side-by-side relation, the chain 60 also extending closely alongside the conveyor chain 40. The chains 60 and 61 are trained around downstream drive sprockets 62 on the shaft 26 and also are trained around upstream idler sprockets 63 which cause the upper runs of the chains to be horizontal. Pushers 64 and 65 (FIG. 4) are carried by the chains 60 and 61, respectively, are fall-away pushers similar to the pushers 47, and include pushing lugs which project upwardly through slots 66 and 67 (FIG. 6) in the bedplate 16. The spacing between the pushers of each of the chains 60 and 61 is equal to the spacing of the pushers of the chain 40. The pushers 64 and 65 are aligned longitudinally with one another and are staggered longitudinally with respect to the pushers 47.

Figure 5:
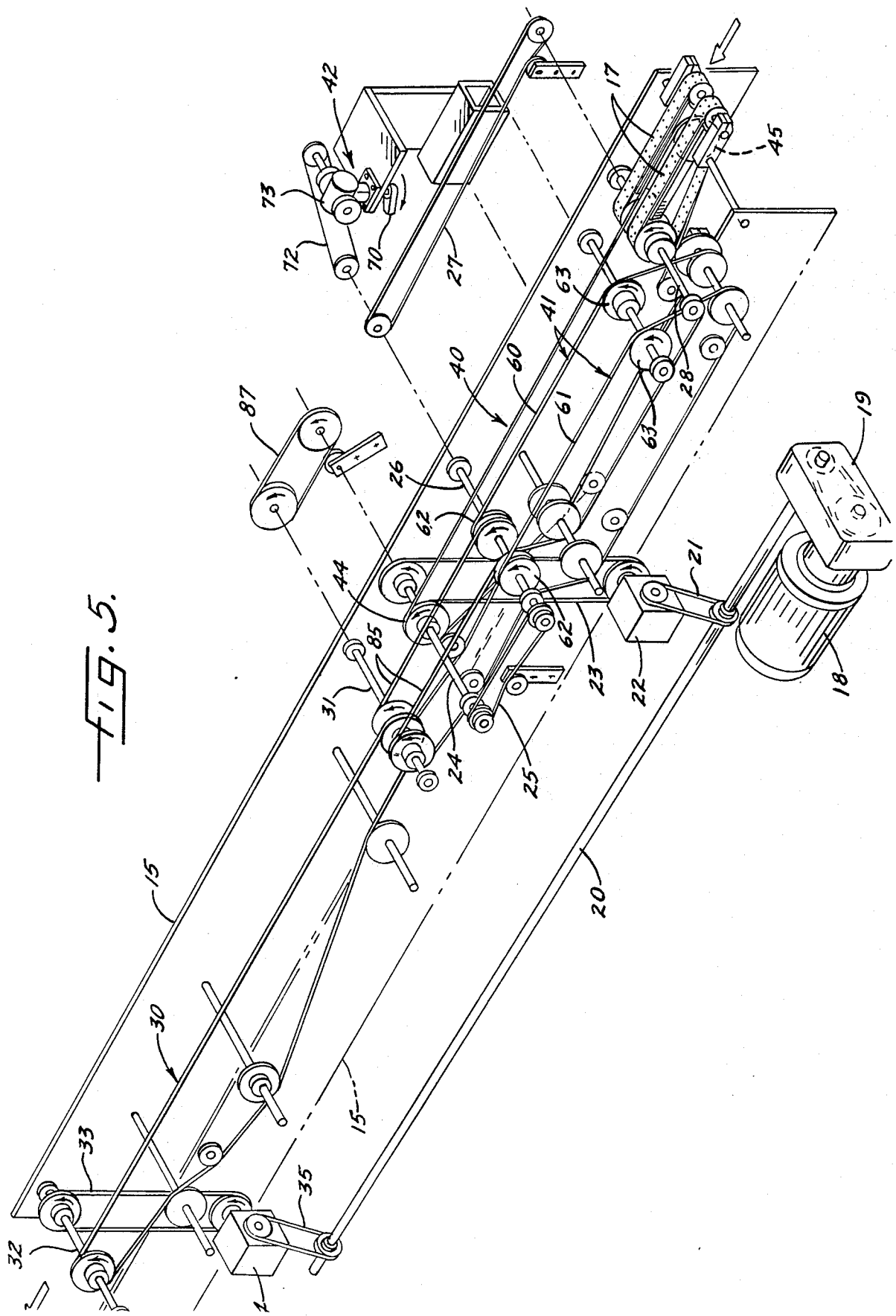
FIG. 5 is a perspective view illustrating the turning mechanism, the various conveyors and the drive therefor.
Figure 6:
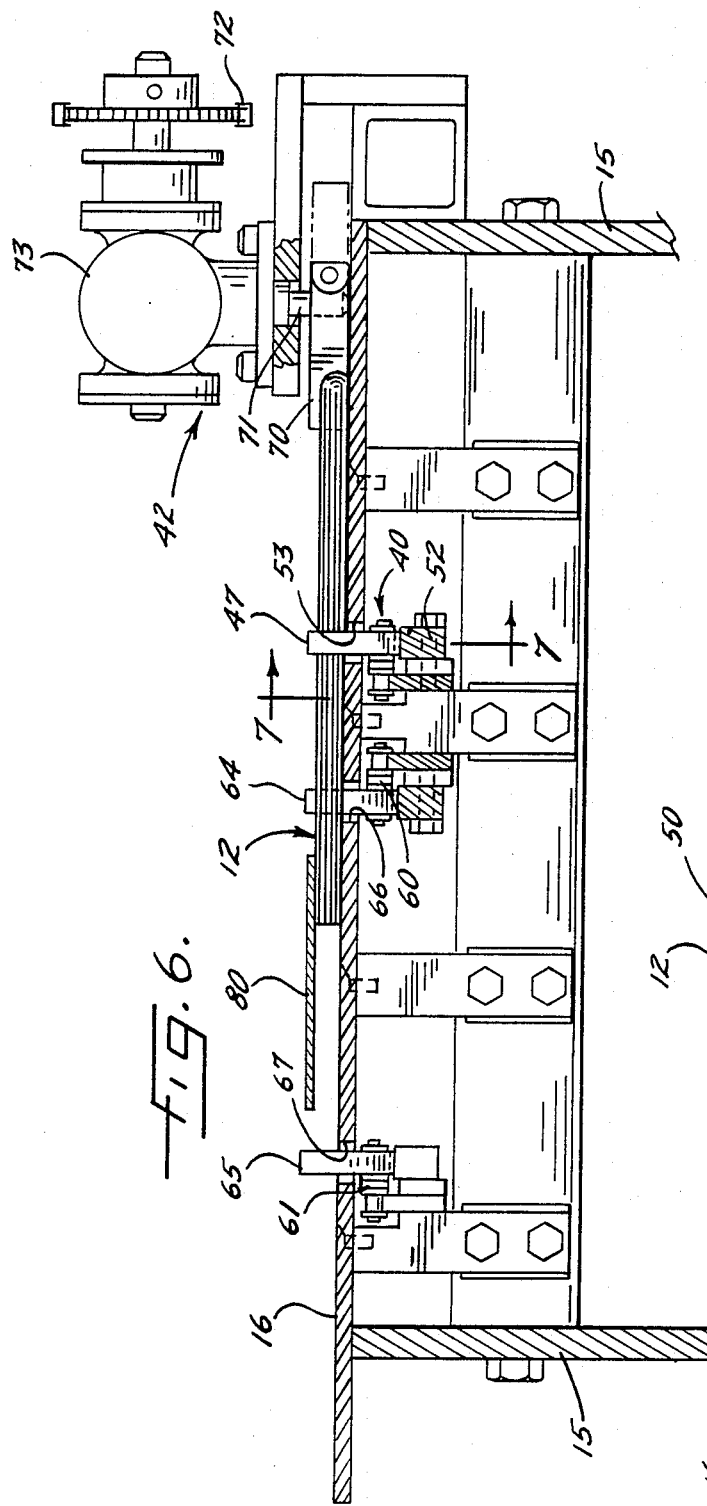
FIG. 6 is an enlarged fragmentary cross-section taken substantially along the line 6—6 of FIG. 1.

As shown most clearly in FIGS. 5 and 6, the turning mechanism 42 includes a camming member 70 in the form of a paddle which projects generally radially from an upright shaft 71. The shaft 71 is adapted to be rotated continuously in a counterclockwise direction and in timed relation with the chains 40, 60 and 61 by a belt drive 72 which is connected between the shaft 26 and a gearbox 73 coupled to the shaft 71.

Figure 4:
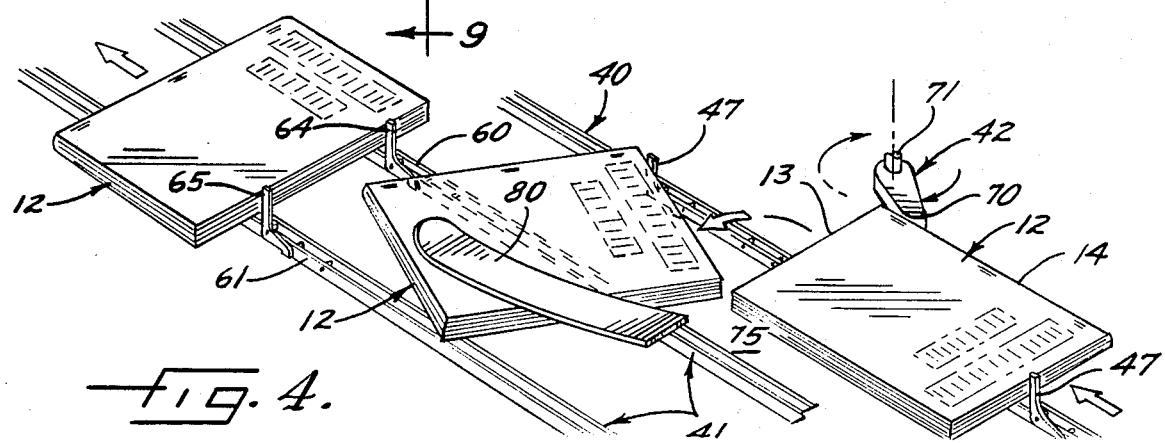
FIG. 4 is a fragmentary perspective view which diagrammatically illustrates the steps of turning the magazine.

The turning mechanism 42 is disposed in a turning station 75 located downstream of the vacuum belts 17. Magazines 12 on the belts are confined to movement along a straight path by a pair of laterally spaced guide members 76 and 77 FIG. 1) which terminate just short of the turning mechanism. While each magazine is being advanced by the vacuum belts 17, it also is picked up by one of the pushers 47 of the chain 40 and is advanced away from the belts by that pusher. The guides 76 and 77 continue to confine each magazine 12 as it is advanced beyond the belts by the pusher 47. During such advance, the pusher 47 is centered laterally with respect to the magazine as shown in FIG. 4, the lateral width of the pusher being substantially less than that of the magazine.

As each magazine 12 approaches the turning station 75, its trailing end moves beyond the guide 77. At this time, the rotating paddle 70 strikes the backbone 14 of the magazine and kicks the magazine laterally toward the conveyor chains 60 and 61. As a result, the magazine is shifted to a laterally offcenter position with respect to the pusher 47 and, as the pusher continues to advance, it causes the magazine to pivot counterclockwise. During this time, the left portion (as viewed from upstream) of the magazine moves beneath a retarder shoe 80 formed by an elongated strip of spring metal located above the bedplate 16. The shoe presses the left portion of the magazine against the bedplate and creates frictional resistance to help turn the magazine as the magazine is advanced by and pivots on the pusher 47.

As each magazine 12 turns, it moves into overlying relation with the conveyor chain 60. Each pusher 64 of the conveyor chain 60 is paired with a pusher 47 of the chain 40 but is spaced upstream therefrom so that each magazine may turn into overlying relation with the conveyor chain 60 without interference from the pusher 64. As the magazine turns, its forward velocity is reduced and thus one of the pushers 64 catches up with the magazine and engages the trailing end thereof to begin advancing the magazine. Such engagement also causes the magazine to turn still further in the counterclockwise direction with such turning being stopped when the magazine has turned through a total of ninety degrees and engages the pusher 65 of the conveyor chain 61. The magazine also is stopped by a shock absorbing bumper 82 (FIG. 9) which is located on the bedplate 16 at the outboard side of the conveyor chain 61. The bumper is carried on a slidable rod 83 which is biased toward the magazines by a coil spring 84. By virtue of the bumper, turning of the magazines is stopped with a cushioned action.

As each magazine 12 is turned, control of the magazine is switched from the conveyor chain 40 to the chains 60 and 61. Thus, the pusher 47 passes by the turned magazine while the pushers 64 and 65 continue the advance of the magazine in a downstream direction. In the present instance, the spacing between the magazines is increased before the magazines are delivered to the exit conveyor 30. For this purpose, a pair of laterally spaced conveyor chains 85 (FIG. 5) with pushers 86 are located between the chains 60, 61 and the exit conveyor 30 and are trained around sprockets on the shafts 26 and 31. The spacing between the pushers of the chains 85 is greater than the spacing between the pushers of the chains 60 and 61. Thus, the chains 85 pick up the magazines from the chains 60 and 61 and increase the spacing between the magazines before feeding the magazines to the exit conveyor 13. The shaft 31 for the chains 85 is driven from the shaft 24 by means of a belt drive 87 (FIG. 5).

From the foregoing, it will be apparent that the present invention brings to the art new and improved apparatus 10 in which the magazines 12 are turned without being stopped and without changing their general direction of travel. As a result, the apparatus is capable of operating at extremely high speeds and may handle magazines at a rate exceeding 300 per minute. Because the magazines travel in the same direction regardless of their orientation, the apparatus 10 extends longitudinally throughout its entirety. Such an in-line or straight-through system makes much more efficient use of floor space than do L-shaped bump and turn systems which change the direction of travel of the magazines.

The apparatus 10 has been shown specifically as imparting only one turn to the magazines 12. It will be appreciated, however, that multiple turns are possible through the use of multiple turning mechanisms 42 and an appropriate arrangement of conveyors similar to the conveyors 40 and 41. For example, a downstream turning mechanism may be positioned on the opposite side of the line from the turning mechanism which has been illustrated and may be used to turn the magazines back to their original positions. The apparatus 10 also may be set up to turn the magazines opposite to the direction which has been shown or, through the use of multiple turning mechanisms, to turn the magazines in the same direction through two, three or four ninety degree turns.

I claim:

1. Apparatus for advancing a succession of horizontally spaced articles along a horizontal path and for turning each article in a horizontal plane and through approximately ninety degrees during the advance, said apparatus comprising a horizontal bedplate for supporting said articles for movement along said path, a first continuously movable conveyor having a horizontally extending upper run and having a succession of spaced pushers for engaging successive articles and advancing said articles in horizontally spaced relation along said bedplate to a turning station, means in said turning station for causing each article to pivot horizontally about its respective pusher and turn on said bedplate as the article advances through the turning station, a second continuously movable conveyor having a horizontally extending upper run and spaced laterally from said first conveyor in a direction to receive each article as the article turns on said bedplate, and a succession of spaced pushers on said second conveyor and paired with the pushers of said first conveyor, each pusher of said second conveyor being spaced laterally and upstream from its paired pusher of the first conveyor whereby each pusher of the second conveyor engages an article being turned on said bedplate and turns such article further while advancing the article downstream from said turning station.

2. Apparatus as defined in claim 1 further including laterally spaced guides located upstream of said turning station and located on opposite sides of said articles to confine said articles to movement in a straight course to said turning station, the pushers of said first conveyor having a lateral width substantially less than the lateral width of said articles and being centered laterally with respect to said articles when said articles are between said guides.

3. Apparatus as defined in claim 2 in which said articles are free of lateral guides when said articles are in said turning station, said means including a member for kicking each article laterally when the article is in said turning station, said articles being kicked laterally to a position in which the articles are laterally offcenter with respect to the pushers of the first conveyor.

4. Apparatus as defined in claim 1 in which each pusher of said second conveyor is defined by a pair of laterally spaced pusher members.

5. Apparatus as defined in claim 1 in which said means comprise a camming member rotatable about an upright axis and periodically engageable with the side of each article in the turning station, and means for rotating said camming member in timed relation with the movement of said first conveyor.

6. Apparatus as defined in claim 5 in which said camming member includes a paddle projecting generally radially from said axis.

7. Apparatus for advancing a succession of horizontally spaced magazines along a horizontal path and for turning each magazine in a horizontal plane and through approximately ninety degrees during the advance, said apparatus comprising a horizontal bedplate supporting said magazine for movement along said path with each magazine resting flat on the bedplate, a first continuously movable conveyor having a horizontally extending upper run and having a succession of spaced pushers for engaging successive magazines and advancing said magazines in horizontally spaced relation along said bedplate to a turning station, laterally spaced guides located upstream of said turning station and located on opposite sides of said magazines to confine said magazines to movement in a straight course to said turning station, said pushers having a lateral width substantially less than the lateral width of said magazines and being centered laterally with respect to said magazines when said magazines are between said guides, mechanism in said turning station for kicking each magazine laterally to cause the magazine to pivot horizontally about its respective pusher and turn horizontally and shift laterally on said bedplate as the magazine advances through the turning station, said magazines being kicked laterally to a position in which the magazines are laterally offcenter with respect to said pushers whereby said pushers continue to turn said magazines horizontally as said pushers advance said magazines past said mechanism, a second continuously movable conveyor having a horizontally extending upper run add spaced laterally from said first conveyor in a direction to receive each magazine as the magazine turns on said bedplate, and a succession of spaced pushers on said second conveyor and paired with the pushers of said first conveyor, each pusher of said second conveyor being spaced upstream and laterally from the paired pusher of the first conveyor whereby each pusher of the second conveyor engages a magazine being turned on said bedplate by a pusher of said first conveyor and turns such magazine further while advancing the magazine downstream from said turning station.

8. Apparatus as defined in claim 7 further including means for pressing a portion of each magazine downwardly into frictional engagement with said bedplate as the magazine advances through the turning station.

9. Apparatus as defined in claim 7 further including a shock absorbing bumper spaced laterally from said second conveyor and stopping and cushioning each magazine when the magazine has been turned through approximately ninety degrees.

* * * * *